United States Patent
Maruyama

(10) Patent No.: US 7,653,760 B2
(45) Date of Patent: Jan. 26, 2010

(54) INFORMATION PLAYBACK APPARATUS AND INFORMATION PLAYBACK METHOD WITH USE OF VENDOR ID COMPARISON

(75) Inventor: Koji Maruyama, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/247,677

(22) Filed: Oct. 8, 2008

(65) Prior Publication Data
US 2009/0157910 A1  Jun. 18, 2009

(30) Foreign Application Priority Data
Dec. 12, 2007  (JP) .............................. 2007-320964

(51) Int. Cl.
G06F 3/00  (2006.01)
G06F 13/12  (2006.01)

(52) U.S. Cl. .............................. 710/16; 710/8; 710/19; 710/36; 710/62

(58) Field of Classification Search ........................ None
See application file for complete search history.

(56) References Cited
U.S. PATENT DOCUMENTS
2004/0143847 A1  7/2004  Suzuki et al.
2005/0123284 A1*  6/2005  Kikuchi et al. .............. 386/125

FOREIGN PATENT DOCUMENTS

| JP | 2004-208290 | 7/2004 |
| JP | 2006-352599 | 12/2006 |
| JP | 2007-150853 | 6/2007 |
| WO | WO 2007/072821 | 6/2007 |
| WO | WO 2007/102413 | 9/2007 |

OTHER PUBLICATIONS

Japanese Office Action dated Jan. 6, 2009 for Appln. No. 2007-320964.
Japanese Office Action dated Mar. 31, 2009 for Appln. No. 2007-320964.

* cited by examiner

*Primary Examiner*—Alan Chen
(74) *Attorney, Agent, or Firm*—Pillsbury Winthrop Shaw Pittman, LLP

(57) ABSTRACT

According to one embodiment, an information playback apparatus according to one embodiment includes a storage module configured to store a vendor table including a formal vendor ID of a self apparatus and one or more registered vendor IDs, and vendor commands respectively associated with the formal vendor ID and the registered vendor IDs, a connection module configured to connect a partner device so as to transfer video data, audio data, and vendor commands, a detection module configured to detect a vendor ID of the partner device, and a vendor ID control module configured to transmit either one of the formal vendor ID of the self apparatus and a temporary vendor ID of the self apparatus selected from the registered vendor IDs to the partner device based on the vendor ID of the partner device.

6 Claims, 5 Drawing Sheets

| | Vendor ID of self apparatus | Vendor ID A | Vendor ID B | Vendor ID C | ... |
|---|---|---|---|---|---|
| play | Vendor command··· | Vendor command··· | Vendor command··· | Vendor command··· | ... |
| FF | Vendor command··· | Vendor command··· | Vendor command··· | Vendor command··· | ... |
| REW | Vendor command··· | Vendor command··· | Vendor command··· | Vendor command··· | ... |
| REC | Vendor command··· | Vendor command··· | Vendor command··· | Vendor command··· | ... |
| ← | Vendor command··· | Vendor command··· | Vendor command··· | Vendor command··· | ... |
| ↑ | Vendor command··· | Vendor command··· | Vendor command··· | Vendor command··· | ... |
| ↓ | Vendor command··· | Vendor command··· | Vendor command··· | Vendor command··· | ... |
| → | Vendor command··· | Vendor command··· | Vendor command··· | Vendor command··· | ... |
| ... | Vendor command··· | | | Vendor command··· | ... |

F I G. 3

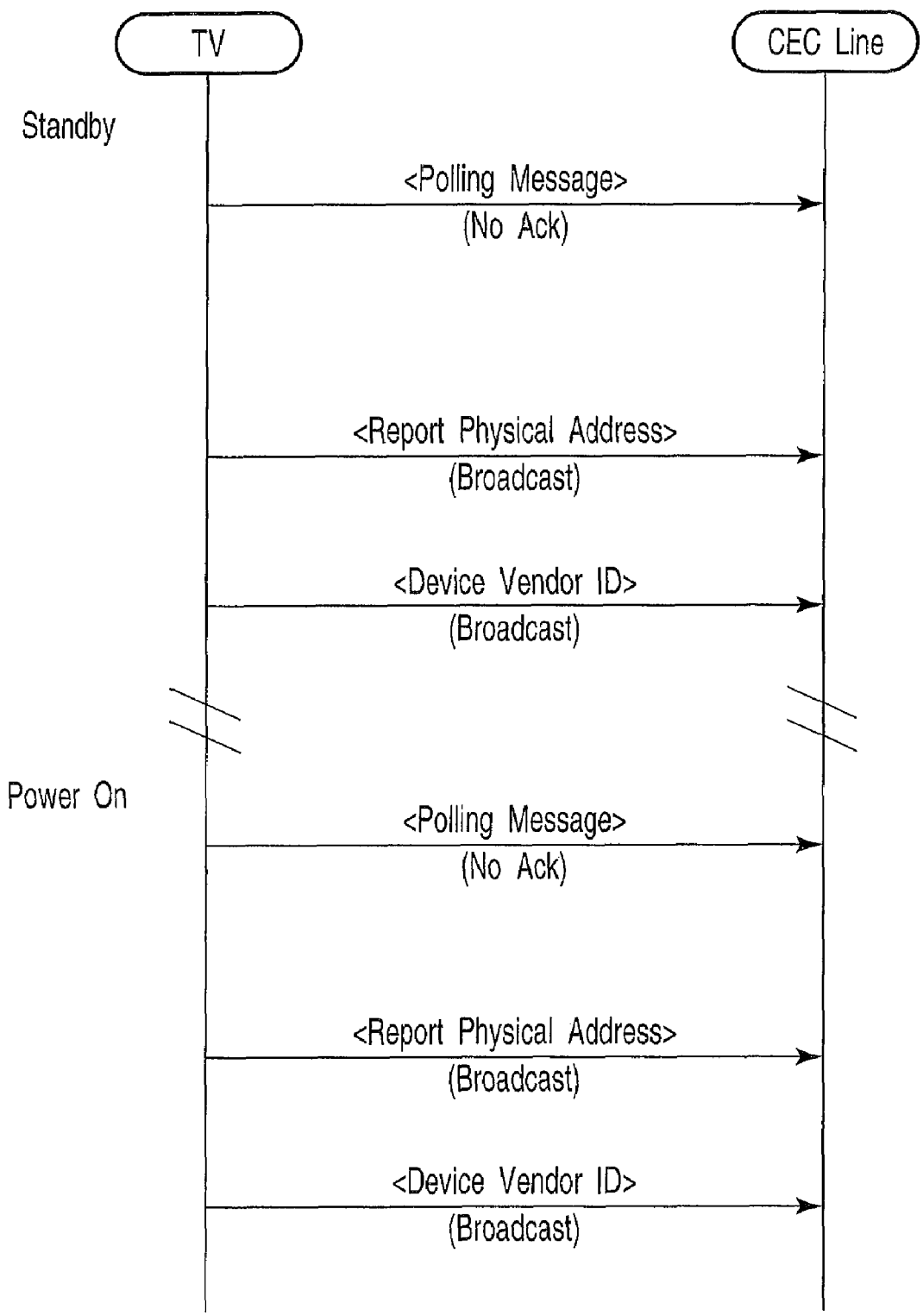
F I G. 4

US 7,653,760 B2

INFORMATION PLAYBACK APPARATUS AND INFORMATION PLAYBACK METHOD WITH USE OF VENDOR ID COMPARISON

CROSS-REFERENCE TO RELATED APPLICATIONS

This application is based upon and claims the benefit of priority from Japanese Patent Application No. 2007-320964, filed Dec. 12, 2007, the entire contents of which are incorporated herein by reference.

BACKGROUND

1. Field

One embodiment of the invention relates to a control technique for video devices and the like based on vendor IDs.

2. Description of the Related Art

In recent years, digital devices, for example, TVs, DVD players, DVD recorders, and AV amplifiers, which equip HDMI (High Definition Multimedia Interface)®, have prevailed. The HDMI can transfer non-compressed video and audio data. Also, by an HDMI-CEC (Consumer Electronics Control) function, the user can operate video devices connected to a TV using a TV remote controller.

The aforementioned HDMI-CEC function currently includes a One touch play function, System Standby function, Remocon Path through function, and the like although these functions vary depending on the HDMI Version. Mandatory functions of HDMI-CEC are enabled when HDMI CEC-compatible devices are connected. However, optional functions and vendor specific functions are often not enabled depending on their combinations.

Various proposals have been made in association with such HDMI equipped devices. For example, Jpn. Pat. Appln. KOKAI Publication No. 2004-208290 has proposed the following technique. That is, in this technique, a display device reads out vendor codes and device codes from all video devices connected to the display device to create a connected device list table. When the user makes a remote controller operation toward the display device, the display device receives a remote controller code, and searches the connected device list table for a vendor code and device code which match those included in the remote controller code. Then, the display device switches a selector to connect a reception interface to which a video device whose vendor code and device code are matched, and displays and plays back AV data transferred from that video device.

According to the aforementioned technique, the display device possesses connected device information of a plurality of video devices connected to the display device. That is, the display device accepts a remote controller operation, and controls playback and the like of AV data from a video device such as a video recording and playback apparatus or the like connected to the display device. Therefore, the video devices have no initiative, and a video device precluded by the display device side cannot undergo control by the display device. That is, if it is limited that the display device controls a video device when the display device and video device of the same vendor are connected, a video device of a vendor different from that of the display device cannot undergo control corresponding to the vendor code by the display device (i.e., when the vendor ID of the display device is different from that of the video device). That is, vendor specific functions are often not enabled depending on combinations.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is a table showing registered vendor IDs according to the embodiment;

FIG. 4 is a chart showing the operation upon HDMI connection according to the embodiment.

DETAILED DESCRIPTION

Various embodiments according to the invention will be described hereinafter with reference to the accompanying drawings. In general, an information playback apparatus according to one embodiment of the invention comprises a storage module configured to store a vendor table including a formal vendor ID of a self apparatus and one or more registered vendor IDs, and vendor commands respectively associated with the formal vendor ID and the registered vendor IDs, a connection module configured to connect a partner device so as to transfer video data, audio data, and vendor commands, a detection module configured to detect a vendor ID of the partner device connected via the connection module, a vendor ID control module configured to compare the formal vendor ID and the registered vendor IDs included in the vendor table with the vendor ID of the partner device, and to transmit either one of the formal vendor ID of the self apparatus and a temporary vendor ID of the self apparatus selected from the registered vendor IDs to the partner device, and an operation control module configured to control an operation by interpreting a vendor command from the partner device, which is input via the connection module, based on the vendor ID of the partner device with reference to the vendor table.

An embodiment of the invention will be described hereinafter with reference to the accompanying drawing.

When a plurality of HDMI devices are connected via HDMI cables, and have an HDMI-CEC function, and when corresponding operations need to be set in the HDMI-CEC function of respective models as a preparation, these corresponding operations need to be effectively set in the HDMI-CEC function.

Figure 1:
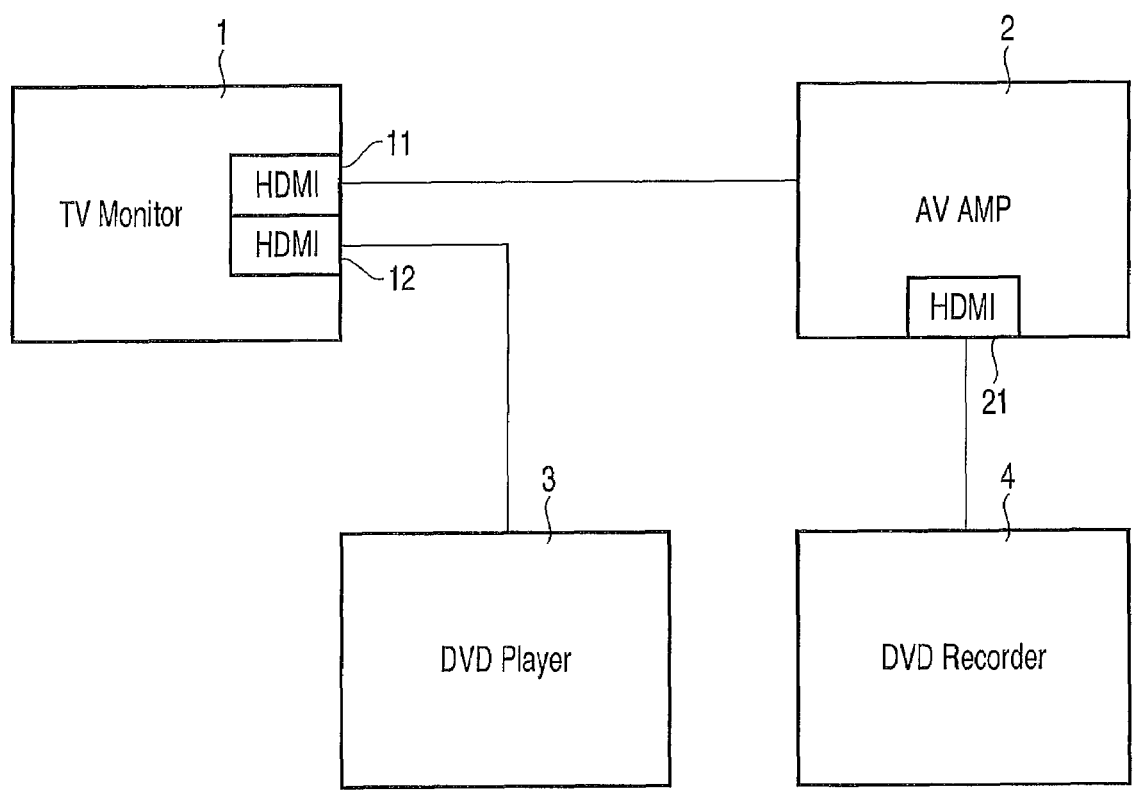
FIG. 1 is a block diagram showing an information playback system configured by HDMI connections according to an embodiment of the present invention.

FIG. 1 is a block diagram showing an example of an information playback system configured by HDMI connections. As shown in FIG. 1, a TV monitor 1 comprises HDMI terminals 11 and 12. An AV amplifier 2 is connected to the HDMI terminal 11 of the TV monitor 1, and an DVD player 3 is connected to the HDMI terminal 12 of the TV monitor 1. Furthermore, an DVD recorder 4 is connected to an HDMI terminal 21 of the AV amplifier 2.

Figure 2:
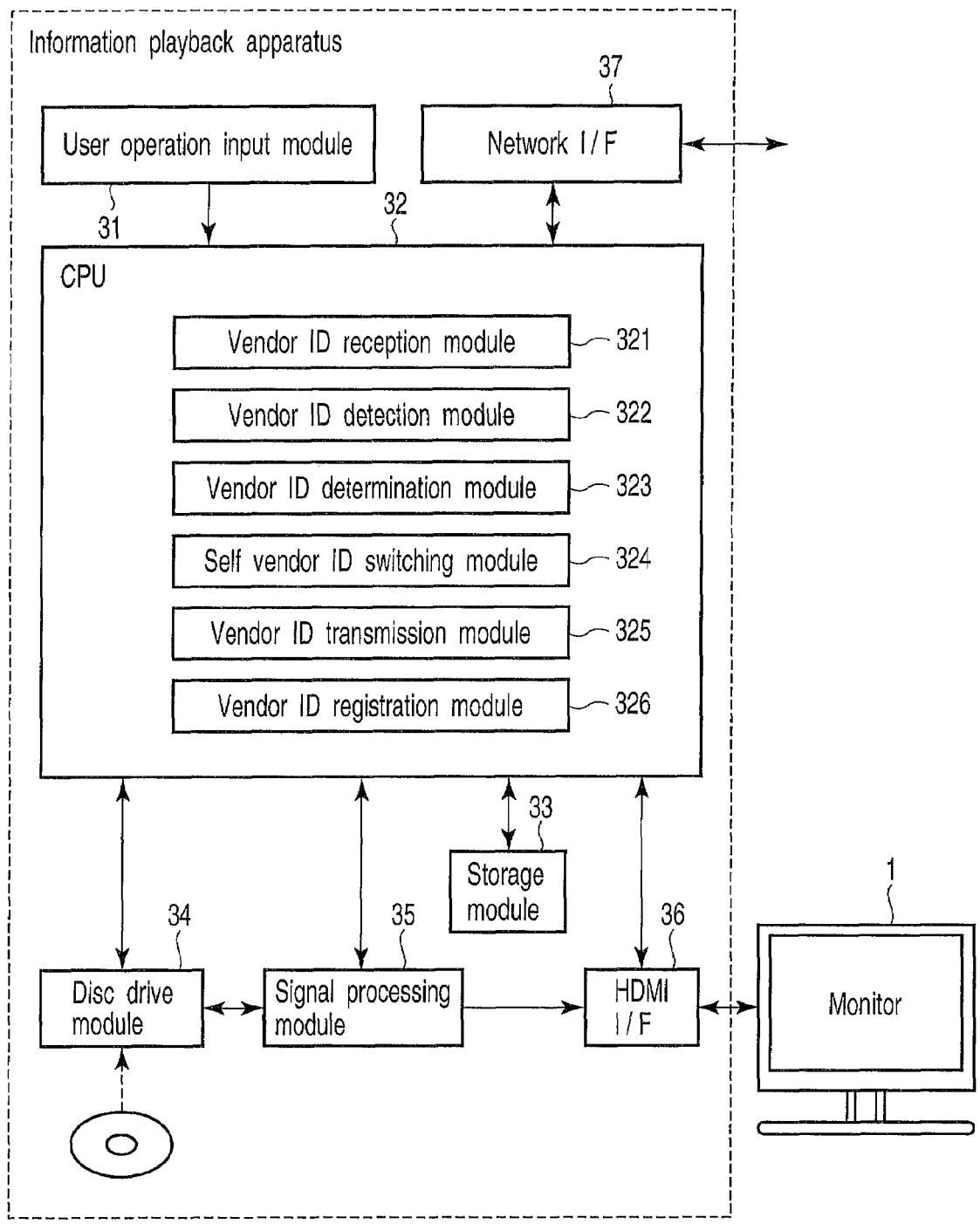
FIG. 2 is a block diagram showing an information playback apparatus according to the embodiment.

FIG. 2 is a block diagram showing an example of an information playback apparatus such as the DVD player 3 or recorder 4 or the like. As shown in FIG. 2, the information playback apparatus comprises a user operation input module 31, CPU 32, storage module 33, disc drive module 34, signal processing module 35, HDMI 36, and network I/F 37.

Furthermore, the CPU 32 comprises a vendor ID reception module 321, vendor ID detection module 322, vendor ID determination module 323, self vendor ID switching module 324, vendor ID transmission module 325, and vendor ID registration module 326.

The user operation input module 31 inputs a user operation to the CPU 32. For example, the module 31 inputs information required upon registration of a vendor ID (to be described later) to the CPU 32. The storage module 33 functions as a storage module configured to store a formal vendor ID of a self apparatus, and registered vendor IDs (vendor ID table). The HDMI 36 functions as a connection module configured to connect a partner device so as to transfer video data, audio data, and vendor commands. The CPU 32 functions as a vendor ID control module configured to detect a vendor ID of a partner device connected via the HDMI 36, and to transmit either one of the registered formal vendor ID of the self apparatus and a temporary vendor ID of the self apparatus selected from the registered vendor IDs based on the registered vendor IDs and the detected vendor ID of the partner device. Details of the vendor ID control by the information playback apparatus will be described later. The disc drive module 34 reads out information from a disc such as a DVD or the like, and records information on a disc such as a DVD or the like. The signal processing module 35 decodes information read out by the disc drive module 34, and transfers the decoded information to the HDMI 36. Also, the module 35 encodes information input via the HDMI 36, and transfers the encoded information to the disc drive module 34.

FIG. 3 shows an example of a vendor table stored in the storage module 33. As shown in FIG. 3, the vendor table includes the formal vendor ID of the self apparatus, and a plurality of registered vendor IDs (i.e., a registered vendor ID_A, registered vendor ID_B, and registered vendor ID_C). Furthermore, the vendor table stores vendor commands (play, FF, REW, REC, ↑, →, ←, ↓, . . . ) in association with each of the formal vendor ID, registered vendor ID_A, registered vendor ID_B, and registered vendor ID_C.

FIG. 4 shows the operation upon HDMI connection.

(1) It is confirmed at the following timings that a logical address "(TV)" is not acquired by <Polling Message>.

(1-1) a timing from power OFF (no electric power is supplied)→standby (a sub-microcomputer is energized)

(1-2) a timing from standby→power ON (a main microcomputer is energized)

(1-3) a timing of +5V Power energization detection (assuming a case in which the apparatus is connected later to an amplifier having dual HDMI outputs)

(2) When a logical address 0(TV) is in use, a logical address (Free Use) is acquired, and when the logical address (Free Use) cannot be acquired, either, the apparatus operates using a logical address (Unregistered).

(3) When the logical address can be acquired (other than the logical address (Unregistered)), <Report Physical Address> and <Device Vendor ID> are broadcast to notify the physical address, device type, and vendor ID.

(4) Upon starting up a set, a CEC device search is conducted, and each discovered device is identified.

Figure 5:
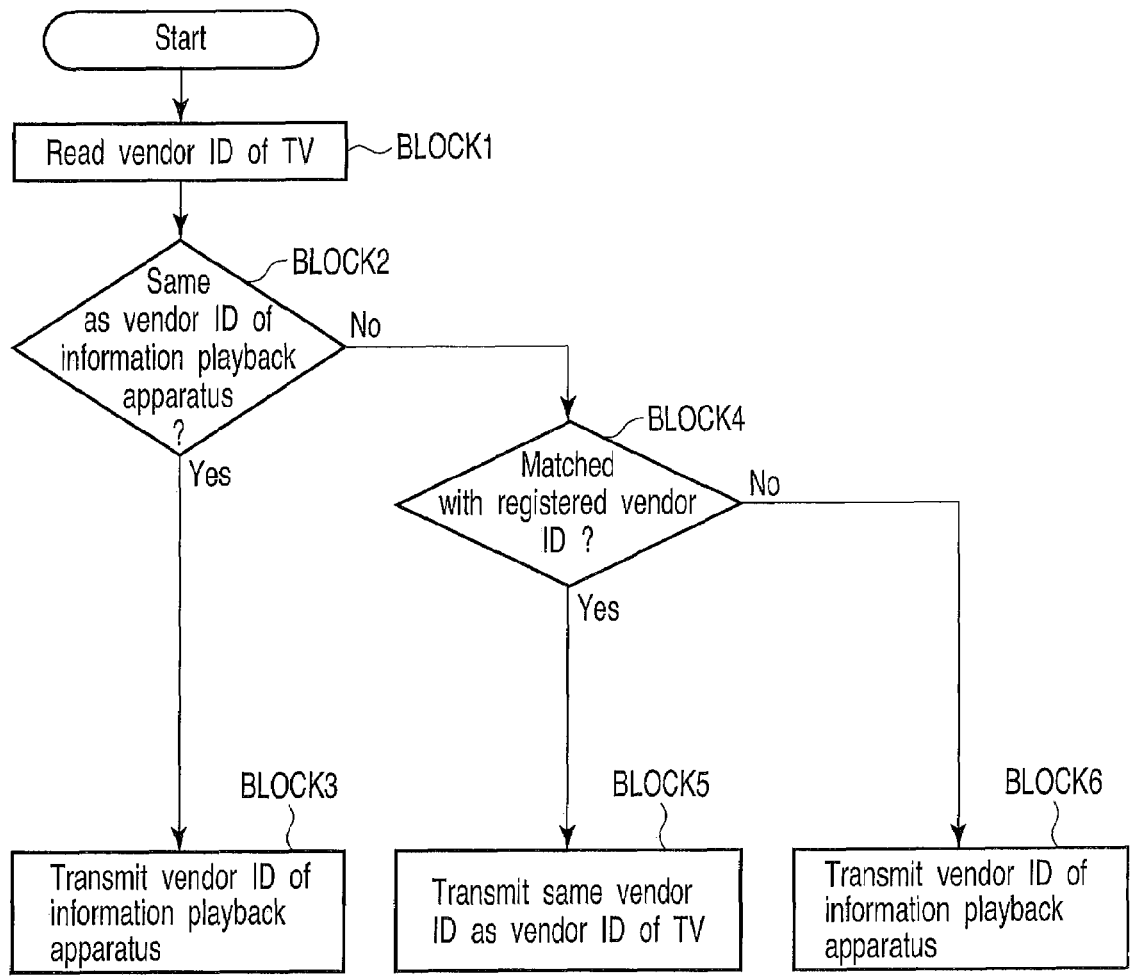
FIG. 5 is a flowchart showing the operations from acquisition to return of a vendor ID by the information playback apparatus according to the embodiment.

FIG. 5 is a flowchart showing an example of the operations from acquisition to return of a vendor ID by the information playback apparatus shown in FIG. 2.

As shown in FIG. 5, a vendor ID is sent from the TV monitor 1 side at an appropriate timing such as a standby timing, power-ON timing, and other required timings. The vendor ID reception module 321 of the information playback apparatus receives a vendor ID (that of a partner device) sent from the TV monitor 1 side (BLOCK1). The vendor ID detection module 322 of the information playback apparatus compares the registered vendor IDs stored in the storage module 33 with the vendor ID of the partner device, and the vendor ID determination module 323 of the information playback apparatus determines a vendor ID of the TV monitor 1 to which the self apparatus is connected. The vendor ID transmission module 325 transmits, to the TV monitor 1, either one of the formal vendor ID of the self apparatus stored in the storage module 33, and a temporary vendor ID of the self apparatus selected from the registered vendor IDs. Details of this processing are as follows.

If the formal vendor ID of the self apparatus stored in the storage module 33 matches the vendor ID of the partner device (YES in BLOCK2), the vendor ID transmission module 325 transmits the formal vendor ID of the self apparatus in response to a device authentication command from the TV monitor 1 (BLOCK3).

If the formal vendor ID of the self apparatus stored in the storage module 33 is different from the vendor ID of the partner device (NO in BLOCK2), and the vendor ID of the partner device matches one of the registered vendor IDs stored in the storage module 33 (YES in BLOCK4), the vendor ID switching module 324 switches the vendor ID of the self apparatus from the formal vendor ID to the matched vendor ID (i.e., the same vendor ID as that of the partner device). The vendor ID transmission module 325 transmits the matched vendor ID (i.e., the same vendor ID as that of the partner device) as a temporary vendor ID of the self apparatus in response to a device authentication command from the TV monitor 1 (BLOCK5). Note that the TV monitor 1 receives the transmitted temporary vendor ID as the formal vendor ID. The TV monitor 1 cannot distinguish the formal and temporary vendor IDs from each other.

If the formal vendor ID of the self apparatus stored in the storage module 33 is different from the vendor ID of the partner device (NO in BLOCK2), and the vendor ID of the partner device does not match any of the registered vendor IDs stored in the storage module 33 (NO in BLOCK4), the vendor ID transmission module 325 transmits the formal vendor ID of the self apparatus in response to a device authentication command from the TV monitor 1 (BLOCK6).

In fact, the information playback apparatus returns the same vendor ID as that of the TV monitor 1 to the TV monitor 1 having the same vendor ID as that stored in the storage module 33. That is, the information playback apparatus fakes a product of the same vendor as the TV monitor 1. Put differently, the TV monitor 1 recognizes the information playback apparatus as a product of the same vendor. Hence, the information playback apparatus can operate in response to vendor commands sent from the remote controller of the TV monitor 1.

For example, when the vendor ID transmitted from the TV monitor 1 matches the registered vendor ID_B (see FIG. 3), the information playback apparatus transmits the matched registered vendor ID_B (i.e., the same vendor ID as that of the partner device) as a temporary vendor ID of the self apparatus. The CPU 32 of the information playback apparatus controls operations (play, FF, REW, REC, ↑, →, ←, ↓, . . . ) by interpreting vendor commands transmitted from the partner device, i.e., the TV monitor 1 side via the HDMI 36 based on the vendor ID of the partner device (=registered vendor ID_B) with reference to the vendor table (vendor commands associated with the registered vendor ID_B).

Registration of a vendor ID will be described below. The vendor ID registration module 326 registers a vendor ID, and the storage module 33 stores the vendor ID to be registered by the vendor ID registration module 326.

For example, upon initial settings, the vendor ID registration module 326 of the information playback apparatus displays a vendor ID registration screen (e.g., an OSD (on-screen display) screen) on the TV monitor 1. The vendor ID registration module 326 of the information playback apparatus registers a vendor ID of the TV monitor 1 as a connection partner, which is input from the vendor ID registration screen via the user operation input module 31. After registration, the information playback apparatus can return the registered vendor ID to the TV monitor 1 as the connection partner as if that ID were a vendor ID of the self apparatus, as described above.

Alternatively, the vendor ID registration module 326 of the information playback apparatus can register a vendor ID and vendor commands corresponding to the vendor ID, which are transmitted from the TV monitor 1 as the connection partner via HDMI-CEC. In this case, the vendor ID registration module 326 of the information playback apparatus displays the vendor ID registration screen on the TV monitor 1, and registers the vendor ID and vendor commands corresponding to the vendor ID after it prompts the user to confirm whether or not to register them. After registration, the information playback apparatus can return the registered vendor ID to the TV monitor 1 as the connection partner as if that ID were a vendor ID of the self apparatus.

When the information playback apparatus and TV monitor 1 of different vendor IDs are connected, and the information playback apparatus receives a vendor command from the TV monitor 1, if the vendor ID of the TV monitor 1 is the registered vendor ID, the information playback apparatus may return "support" to the TV monitor 1 in response to a confirmation request as to "whether or not vendor commands of the TV monitor 1 are supported" from the TV monitor 1, and may then cope with a vendor command transmitted from the TV monitor 1.

In the above description, this embodiment has been described taking the HDMI-CEC function as an example. However, the vendor commands may be sent via a LAN, Bluetooth®, or USB connection.

The case has been explained wherein the information playback apparatus returns the same registered vendor ID as that of the TV monitor 1 in correspondence with the vendor ID of the TV monitor 1. That is, the case has been explained wherein the information playback apparatus fakes a product of the same vendor as the TV monitor 1. However, this embodiment is not limited to such specific case. For example, the information playback apparatus may merely return "compatible" in response to an inquiry as to "whether or not the vendor ID is compatible" from the TV monitor 1, and even when the vendor ID of the information playback apparatus is different from that of the TV monitor 1 in practice, the TV monitor 1 may transmit a vendor command to the information playback apparatus.

The network I/F 37 of the information playback apparatus may acquire a vendor ID and vendor commands corresponding to this vendor ID, and may register them in the storage module 33. That is, the network I/F 37 may establish connection to a network server of the vendor of the partner device, and may acquire the vendor ID and vendor commands corresponding to this vendor ID from the network server. As a result, the information playback apparatus need not store many vendor IDs and vendor commands all the time. In some cases, the information playback apparatus may store only the vendor ID and vendor commands of the partner device, and may delete them after disconnection from the partner device. In this way, the storage resources of the information playback apparatus can be effectively used, and compatibility to new devices is high.

Conventionally, when an information playback apparatus connected to a TV has a vendor ID different from that of the TV, it cannot be controlled by vendor commands associated with the vendor ID of the TV. Also, the operations of the information playback apparatus are often limited under the condition that the connected TV and information playback apparatus have different vendor IDs.

According to this embodiment, even when the information playback apparatus connected to the TV has a vendor ID different from that of the TV, it returns the same vendor ID as that of the TV, so that the information playback apparatus connected to the TV can be operated by only the remote controller of the TV as in a device having the same vendor ID as that of the TV. That is, the information playback apparatus can operate by interpreting vendor commands corresponding to the vendor ID of the TV.

Furthermore, the information playback apparatus can cope with connected devices other than registered vendor IDs when it learns the vendor ID of the connection partner.

The Version of the HDMI standard describes an HDMI-CEC part. However, vendor commands corresponding to each vendor ID depend on the specifications of each vendor. Conventionally, when a player or recorder of a vendor different from that of a TV monitor or projector is connected, it is inconvenient that such player or recorder is incompatible to vendor commands of HDMI-CEC. According to this embodiment, such inconvenience can be eliminated, and even when a monitor and player of different vendors are connected, the player can be operated even by the vendor commands of HDMI-CEC.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information playback apparatus comprising:
   a storage module configured to store a vendor table including a formal vendor ID of a self apparatus and one or more registered vendor IDs, and vendor commands respectively associated with the formal vendor ID and the registered vendor IDs;
   a connection module configured to connect a partner device so as to transfer video data, audio data, and vendor commands;
   a detection module configured to detect a vendor ID of the partner device connected via the connection module;
   a vendor ID control module configured to compare the formal vendor ID and the registered vendor IDs included in the vendor table with the vendor ID of the partner device, to transmit the formal vendor ID to the partner device when the formal vendor ID of the self apparatus is identical to the vendor ID of the partner device, to transmit the same registered vendor ID to the partner device when the formal vendor ID of the self apparatus is different from the vendor ID of the partner device and the vendor ID of the partner device is identical to one of the one or more registered vendor IDs, and to transmit the formal vendor ID of the self apparatus to the partner device when the formal vendor ID of the self apparatus is different from the vendor ID of the partner device and the vendor ID of the partner device is different from any one of the one or more registered vendor IDs; and an operation control module configured to control an operation by interpreting a vendor command from the partner device, which is input via the connection module, based on the vendor ID of the partner device with reference to the vendor table.

2. The apparatus according to claim 1, wherein when the same registered vendor ID as the vendor ID of the partner device is transmitted to the partner device, the operation control module controls an operation by interpreting a vendor command input from the partner device via the connection module with reference to the vendor commands associated with the same registered vendor ID as the vendor ID of the partner device included in the vendor table.

3. The apparatus according to claim 1, which further comprises a registration module configured to register the vendor ID of the partner device.

4. The apparatus according to claim 3, wherein the registration module registers the vendor ID of the partner device input from the partner device via the connection module.

5. The apparatus according to claim 3, which further comprises a network connection module configured to connect a network server via a communication line, and in which the registration module registers the vendor ID of the partner device input via the network connection module.

6. An information playback method comprising:

detecting a vendor ID of a partner device connected via a connection module which connects the partner device so as to transfer video data, audio data, and vendor commands;

comparing the vendor ID of the partner device with a formal vendor ID of a self apparatus and one or more registered vendor IDs in a vendor table which includes the formal vendor ID of the self apparatus and the registered vendor IDs, and vendor commands respectively associated with the formal vendor ID of the self apparatus and the registered vendor IDs, transmitting the formal vendor ID to the partner device when the formal vendor ID of the self apparatus is identical to the vendor ID of the partner device, transmitting the same registered vendor ID to the partner device when the formal vendor ID of the self apparatus is different from the vendor ID of the partner device and the vendor ID of the partner device is identical to one of the one or more registered vendor IDs, and transmitting the formal vendor ID of the self apparatus to the partner device when the formal vendor ID of the self apparatus is different from the vendor ID of the partner device and the vendor ID of the partner device is different from any one of the one or more registered vendor IDs; and controlling an operation by interpreting a vendor command input from the partner device via the connection module based on the vendor ID of the partner device with reference to the vendor table.

* * * * *